United States Patent
Albouze et al.

(10) Patent No.: US 7,587,495 B2
(45) Date of Patent: Sep. 8, 2009

(54) AUTOMATIC CONFIGURATION OF CONTROLLER COMPUTERS IN A NETWORK

(75) Inventors: Jean François Albouze, Boulder Creek, CA (US); Michael R. Margolis, San Jose, CA (US)

(73) Assignee: APPLE Inc, Cupertino, CA (US)

( * ) Notice: Subject to any disclaimer, the term of this patent is extended or adjusted under 35 U.S.C. 154(b) by 852 days.

(21) Appl. No.: 10/928,026

(22) Filed: Aug. 26, 2004

(65) Prior Publication Data

US 2006/0047827 A1 Mar. 2, 2006

(51) Int. Cl.
*G06F 15/16* (2006.01)
*G06F 15/177* (2006.01)
*G06F 15/173* (2006.01)

(52) U.S. Cl. .................. 709/227; 709/220; 709/230; 709/225

(58) Field of Classification Search .............. 709/220, 709/228, 229, 224, 225, 226, 227, 230; 370/310
See application file for complete search history.

(56) References Cited

U.S. PATENT DOCUMENTS

| | | | | |
|---|---|---|---|---|
| 6,892,230 | B1* | 5/2005 | Gu et al. | 709/220 |
| 7,299,304 | B2* | 11/2007 | Saint-Hilaire et al. | 710/11 |
| 2003/0063608 | A1* | 4/2003 | Moonen | 370/390 |
| 2004/0153548 | A1* | 8/2004 | Latvakoski et al. | 709/228 |
| 2004/0212497 | A1* | 10/2004 | Stilp | 340/539.17 |
| 2007/0274240 | A1* | 11/2007 | Weidenhaupt et al. | 370/310 |

OTHER PUBLICATIONS

Petri Palmila "Zeroconf and UPnP techiniques" Helsinki University of Technology, 2007, pp. 1-5.*
Health Johns "Understanding Zeroconf and Multicast DNS" Dec. 2002, pp. 1-8.*
"Zero COnfiguration Networking (Zeroconf)" pp. 1-3, Nov. 2002, pp. 1-3.*
Thaler et al "Zeroconf Multicast Address Allocation Protocol", Oct. 2002, pp. 1-18.*
Williams "Requirements for Automatic Configuration of IP Hosts" Sep. 2002, Motorola, pp. 1-28.*

* cited by examiner

*Primary Examiner*—Larry D Donaghue
*Assistant Examiner*—Karen C Tang
(74) *Attorney, Agent, or Firm*—Sawyer Law Group LLP

(57) ABSTRACT

A system for automatic configuration of computers on a network is disclosed. In a first aspect a storage area network is disclosed. The network comprises at least one controller; and a plurality of clients coupled to the at least one controller. The network includes a storage device coupled to the at least one controller and the plurality of clients. The controller upon attachment to the network registers itself and notifies the plurality of clients. The plurality of clients then interrogates the controller. Each of the plurality of clients updates its configuration based upon the interrogation.

In a second aspect, a method for configuration of computers in a network is disclosed. The method comprises registering at least one controller upon attachment to the network and notifying a plurality of clients by the at least one controller The method includes interrogating the at least one controller by each of the plurality of clients. The plurality of clients are updated based upon the interrogation.

23 Claims, 5 Drawing Sheets

Client
102

Controller
104

AUTOMATIC CONFIGURATION OF CONTROLLER COMPUTERS IN A NETWORK

FIELD OF THE INVENTION

The present invention relates to computer networks and more particularly to a system and method for configuring computers in such a network.

BACKGROUND OF THE INVENTION

A typical storage area network (SAN) is usually composed of computers acting as controllers (a.k.a. metadata controllers) and computers acting as clients (ex: video editing workstations). All computers are connected between each other using an internet protocol (IP) network and connected to a storage pool (ex: RAID systems) using Fiber Channel interfaces.

Within the SAN or from outside such as from a computer connected to the Internet, a computer can run a SAN administration software in order to setup and monitor meta-data controllers, by remotely connecting to each controller using server manager technology, a client/server administrative solution.

SAN administrators usually need to configure every single computer that is part of a SAN. Typical configuration tasks include specifying what other computers on the SAN are the metadata controllers or the "arbitrators" of file exchanges.

Such configuration tasks usually occur any time a new computer is physically disconnected to the SAN or during the initial setup of the SAN, in this case many computers may need to be configured.

Accordingly, what is needed is a system that allows for automatic configuration of a plurality of devices on a computer network. The system should be efficient, easy to use and easily adaptable to existing networks. The present invention addresses such a need.

SUMMARY OF THE INVENTION

A system for automatic configuration of computers on a network is disclosed. In a first aspect a storage area network is disclosed. The network comprises at least one controller; and a plurality of clients coupled to the at least one controller. The network includes a storage device coupled to the at least one controller and the plurality of clients. The controller upon attachment to the network registers itself and notifies the plurality of clients. The plurality of clients then interrogates the controller. Each of the plurality of clients updates its configuration based upon the interrogation.

In a second aspect, a method for configuration of computers in a network is disclosed. The method comprises registering at least one controller upon attachment to the network and notifying a plurality of clients by the at least one controller The method includes interrogating the at least one controller by each of the plurality of clients. The plurality of clients are updated based upon the interrogation.

In a third aspect, a client computer is disclosed. The client computer includes a file system; and an operating system for communicating with the file system. The operating system includes the discovery mechanism. The client is notified of a registration of at least one controller by the discovery mechanism and interrogates the at least one controller and updates its configuration via the file system and the discovery mechanism.

An advantage of a system and method in accordance with the present invention is that when client computers auto configure themselves, it saves administrators a great deal of time and effort since administrators no longer need to visit or remotely connect to each computer and perform repetitive tasks.

DETAILED DESCRIPTION OF THE INVENTION

The present invention relates to computer networks and more particularly to a system and method for configuring computers in such a network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention takes advantage of the discovery mechanism inherent within each of the clients and controllers of a network to allow for the configuration of the clients within a network whenever a new controller appears on the network. In so doing, automatic configuration of devices on a SAN network is accomplished in a minimal amount of time. To describe the features of the present invention in more detail, refer now to the following discussion in conjunction with the accompanying figures.

Figure 1:
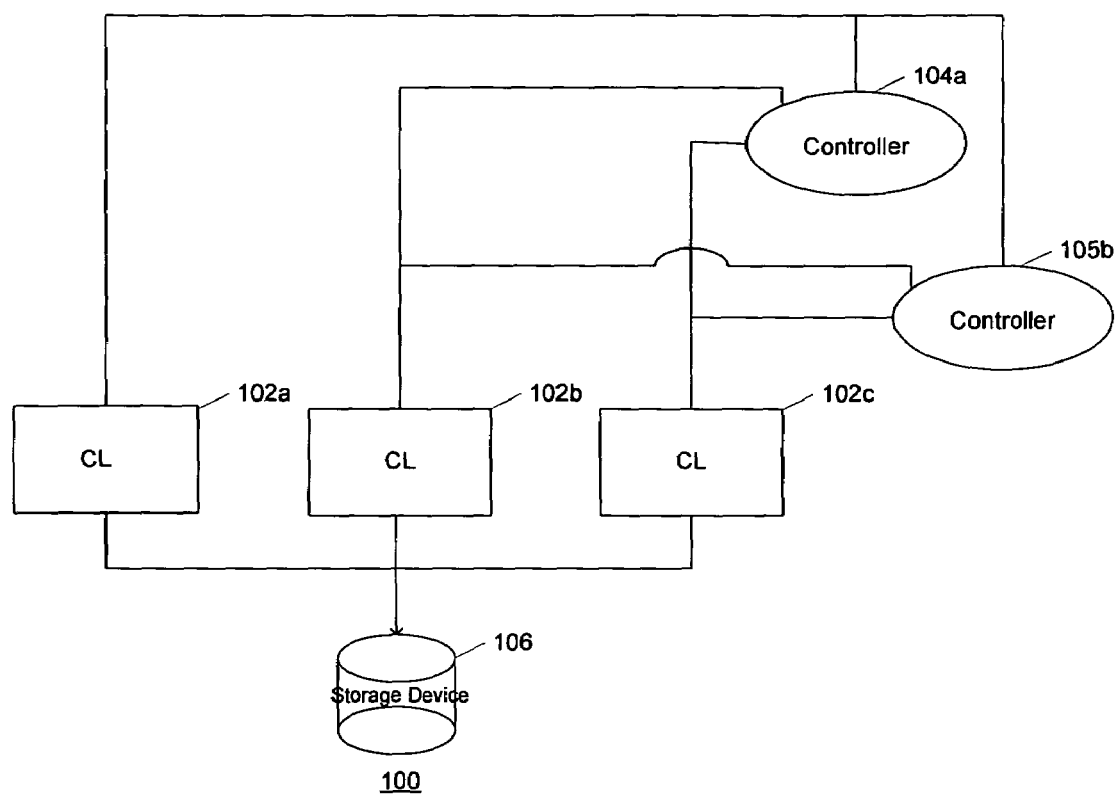
FIG. 1 illustrates a conventional storage area network (SAN) system.

FIG. 1 illustrates a storage area network (SAN) system 100. The SAN system 100 includes a plurality of clients 102a-102c coupled together via a network such as fiber channel to a storage device 106. At least one controller (in this case two controllers 104a and 104b) are coupled to each of the clients 102a-102c and the storage device 106 as is seen.

Figure 2:
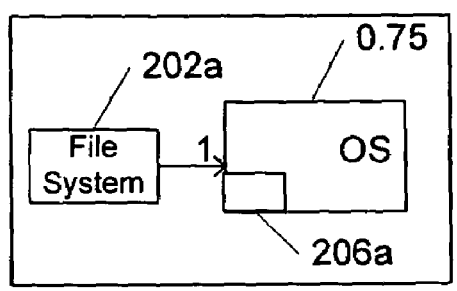
FIG. 2 illustrates a simple block diagram of a client and controller.
Figure 2:
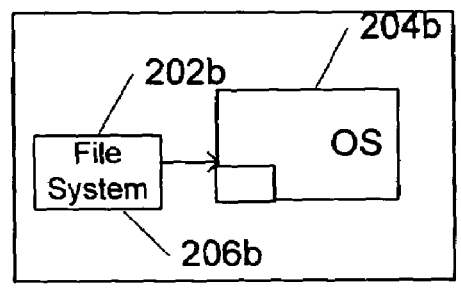

FIG. 2 illustrates a simple block diagram of a client 102 and controller 104. A file system 202a and 202b as well as an operating system (OS) 204a and 204b are within both the client 102 and controller 104 respectively. Within each of the OS 204a and 204b is a discovery mechanism 206a and 206b such as Rendezvous, a product offered by Apple Computer, Inc., which allows for the automatic discovery of computer devices and services on an IP network.

Automatic configuration of computers in accordance with the present invention on a SAN relies on a discovery mechanism such as Rendezvous by Apple Computer. Rendezvous enables automatic discovery of computers, devices, and services on IP networks. Rendezvous uses industry standard IP protocols to allow devices to automatically find each other without the need to enter IP addresses or configure servers. Rendezvous requires that devices implement three essential things. These devices must be able to:

1. Allocate IP addresses without a Dynamic Host Configuration Protocol (DHCP) server 2. Translate between names and IP addresses without a Domain Name System (DNS) server 3. Locate or advertise services without using a directory server.

In addition, other technologies such as the ability for a local program to remotely access information from another computer with full or limited privileges can be utilized by a system and method in accordance with the present invention to allow for automatic configuration of computers in a network.

A system and method in accordance with the present invention can be implemented utilizing a computer readable medium such as a compact disk, floppy disk, DVD disk, or a Flash storage medium.

Figure 3A:
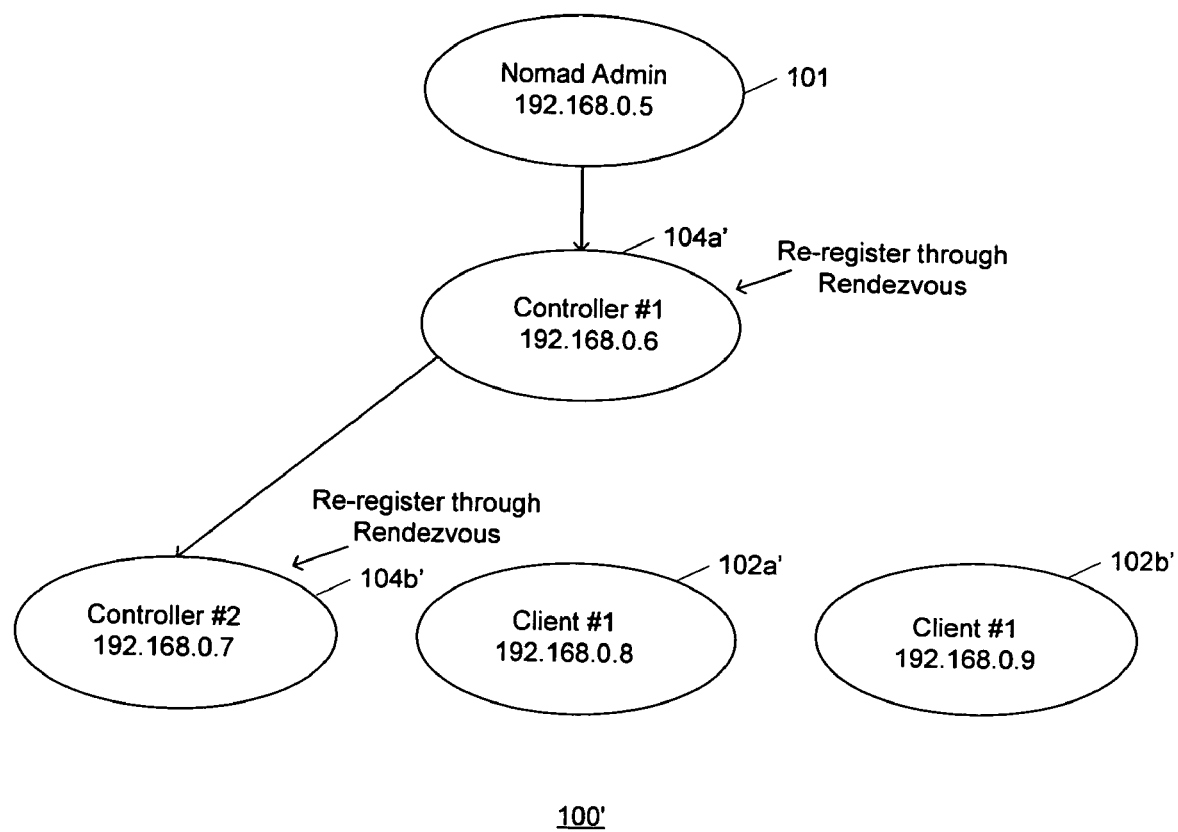
FIGS. 3A and 3B illustrate a system configuration in accordance with the present invention.
Figure 3B:
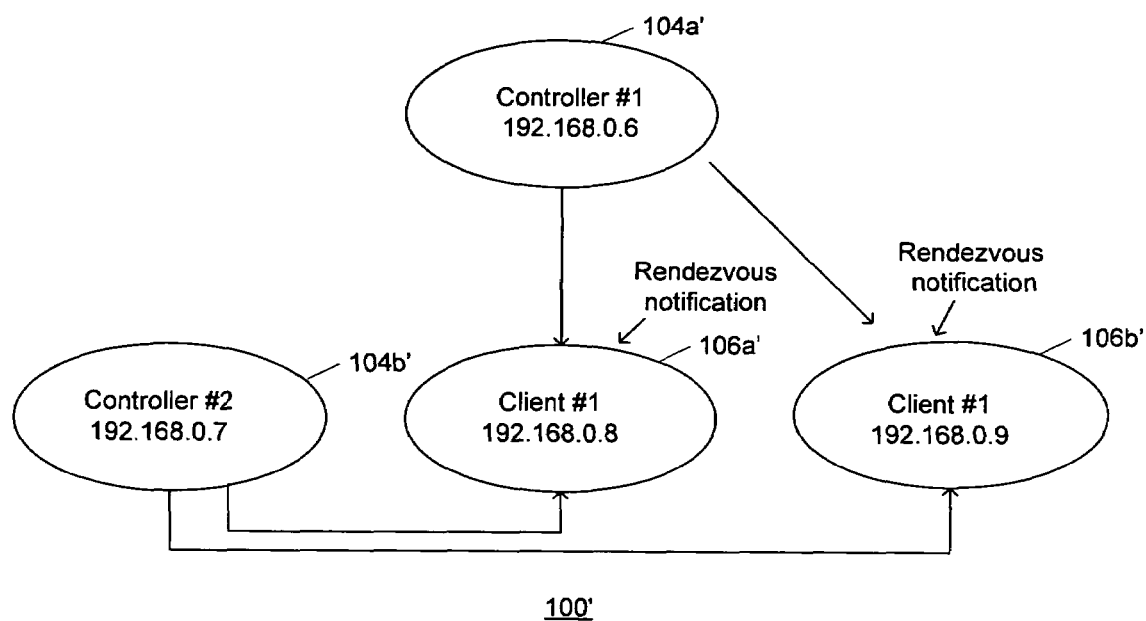
Figure 4:
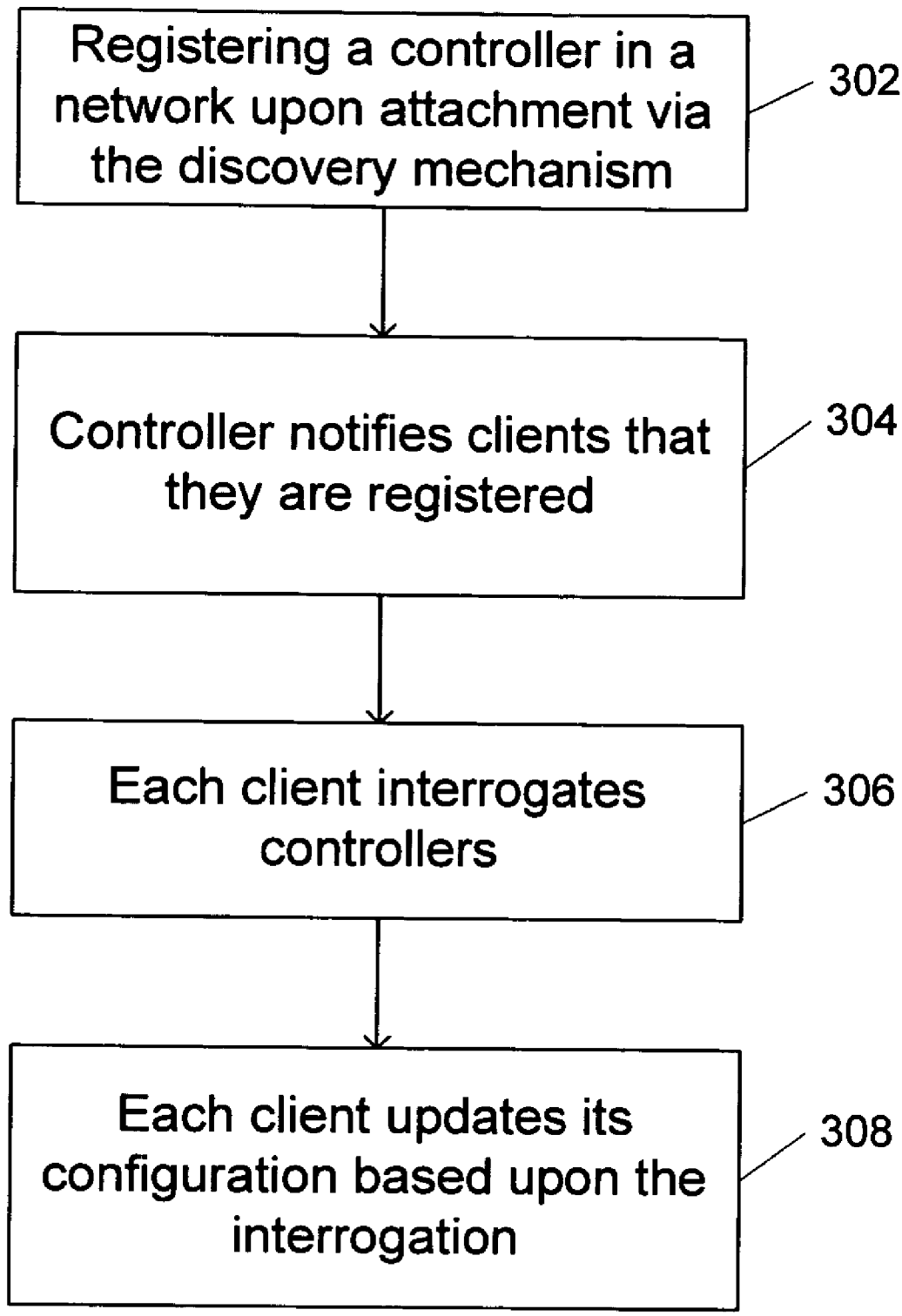
FIG. 4 is a flow chart of a configuration system in accordance with the present invention.

FIGS. 3A and 3B illustrate a system configuration in accordance with the present invention. FIG. 4 is a flow chart of a configuration system in accordance with the present invention.

Referring to FIG. 3A, when an administrator 101 sets up one or more controllers 104a and 104b (either from the genesis case by giving a computer the role of a controller Or by adding a new computer and giving it the role of a controller), the one or more controllers 104a and 104b registers their "signature" utilizing the discovery mechanism.

Referring now to FIG. 4 in conjunction with FIGS. 3A and 3B, controllers 104a and 104b are registered in a network upon attachment via the discovery mechanism (FIG. 3A), via step 302. The one or more controllers 104a and 104b then notify the plurality of clients 106a and 106b that they are registered (FIG. 3B), via step 304. This notification occurs, for example, by the controller broadcasting its IP address to the clients.

As is seen in FIG. 3B, the IP address at controller 104a (192.168.0.6) is broadcast to clients 106a and 106b. Thereafter each of the one or more clients 104a and 104b interrogates the one or more controllers 104a and 104b, via step 306. This interrogation, for example, includes accessing information about the controller and the capabilities. Finally, each of the one or more clients 106a and 106b updates their configuration based upon the interrogation, via step 308.

As is well known, in a SAN network it is possible to have controllers which can be interrogated by a client, but that controller is not part of the network. In a system and method in accordance with the present invention, any client on a network starts a synchronization sequence by interrogating all controllers on the network, filtering out those controllers which are not part of the same network and querying the configuration of the first controller coupled to the network. The client then updates its configuration and is ready to access resources on the network. This happens automatically and transparently without any human intervention.

One will recognize that an IP network (typically a sub-net) may be used to host several independent networks which is why the synchronization sequence is not trivial, since a client needs to find a controller that manages the same storage device sets the clients sees. Since it is not possible for a controller to register its "view" of the storage device sets with the discovery mechanism (this data could be too big) then it requires the subsequent interrogation process aforementioned.

A significant advantage of a system and method in accordance with the present invention is that when client computers auto configure themselves once attached to a SAN network, it saves administrators a great deal of time and effort since administrators no longer need to visit or remotely connect to each computer and perform repetitive tasks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. An Internet Protocol network comprising:
a plurality of controller computers; and
a plurality of clients coupled to the plurality of controller computers; wherein the plurality of controller computers in response to attachment to the network are operable to automatically self-register themselves using a discovery mechanism within each of the plurality of clients; and to notify the plurality of clients, and each of the plurality of clients to interrogate the plurality of controller computers and each of the plurality of clients to update its configuration based upon the interrogation; and wherein any of the plurality of clients to start a synchronization sequence to interrogate the plurality of controller computers, filtering out those controller computers which are not part of the network and querying the configuration of a first controller it finds that is coupled to the network, wherein each of the controller computers and each of the plurality of clients perform the following: providing for allocating IP addresses without a Dynamic Host Configuration Protocol (DHCP) server; providing for translating between names and IP addresses without a Domain Name System (DNS) server; and, locating or advertising services without a directory server.

2. The network of claim 1 wherein the network includes a storage area device coupled to plurality of controller computers and the plurality of clients.

3. The network of claim 2 wherein the plurality of controller computers notifies the plurality of clients by broadcasting its internet protocol address to the plurality of clients.

4. The network of claim 3 wherein the interrogation includes accessing information about the plurality of controller computers and its capabilities.

5. The network of claim 1 wherein each of the plurality of clients are notified via a discovery mechanism of the controller computers.

6. The network of claim 1 wherein a file system and discovery mechanism within each of the plurality of clients provides the interrogation of the plurality of controller computers.

7. A method for configuration of controller computers in an Internet Protocol (IP) network, the method comprising:
automatically self-registering a plurality of controller computers upon attachment to the network, using a discovery mechanism within each of a plurality of clients;
notifying a plurality of clients coupled with the plurality of controller computers by the plurality of controller computers; and
interrogating the plurality of controller computers by each of the plurality of clients coupled with the plurality of controller computers; wherein each of the plurality of clients are thereafter updated based upon the interrogation; and wherein any of the plurality of clients starts a synchronization sequence to interrogate the plurality of controller computers, filtering out those controller computers which are not part of the network and querying the configuration of a first controller computer it finds that is coupled to the network, wherein each of the controller computers and each of the plurality of clients perform the following: providing for allocating IP addresses without a Dynamic Host Configuration Protocol (DHCP) server; providing for translating between names and IP addresses without a Dynamic Host System (DNS) sewer; and, locating or advertising services without a directory server.

8. The method of claim 7 wherein the network includes a storage area device coupled to the plurality of controller computers and the plurality of clients.

9. The method of claim 8 wherein the plurality of controller computers notifies the plurality of clients by broadcasting its internet protocol address to each of the plurality of clients.

10. The method of claim 9 wherein the interrogation includes accessing information about the plurality of controller computers and its capabilities.

11. The method of claim 7 wherein each of the plurality of clients are notified via a discovery mechanism of the plurality of controller computers.

12. The method of claim 7 wherein a file system and discovery mechanism within each of the plurality of clients provides the interrogation of the plurality of controller computers.

13. A client computer system comprising:
a plurality of controller computers in an Internet Protocol (IP) network;
a plurality of clients;
a file system; and
an operating system for communicating with the file system; the operating system including the discovery mechanism, wherein the client computer is coupled with the plurality of controller computers, to notify the client computer of an automatic self-registration of the plurality of controller computers by the discovery mechanism within each of the plurality of clients; to interrogate the plurality of controller computers and to update its configuration via the file system and the discovery mechanism; and wherein a synchronization sequence is initiated by the client computer to interrogate the plurality of controller computers, filtering out those controller computers which are not part of the network and querying the configuration of a first controller computers it finds that is coupled to the network, wherein each of the controller computers and each of the plurality of clients perform the following: providing for allocating IP addresses without a Dynamic Host Configuration Protocol (DHCP) server; providing for translating between names and IP addresses without a Domain Name System (DNS) server; and, locating or advertising services without a directory server.

14. The client computer system of claim 13 wherein the interrogation includes accessing information about the plurality of controller computers and its capabilities.

15. The client computer system of claim 13 wherein a synchronization sequence is initiated by the client computer by interrogating the plurality of controller computers, filtering out those controller computers which are not part of the same network and querying the configuration of a first controller computers that is coupled to the same network.

16. A computer readable medium containing program instructions for the configuration of controller computers in an Internet Protocol (IP) network, the program instructions comprising:
automatically self-registering a plurality of controller computers upon attachment to the network, using a discovery mechanism within each of a plurality of clients;
notifying a plurality of clients coupled with the plurality of controller computers by the plurality of controller computers; and
interrogating the plurality of controller computers by each of the plurality of clients coupled with the plurality of controller computers; wherein each of the plurality of clients are thereafter updated based upon the interrogation; and wherein any client starts a synchronization sequence to interrogate the plurality of controller computers, filtering out those controller computers which are not part of the network and querying the configuration of a first controller computer it finds that is coupled to the network, wherein each of the controller computers and each of the plurality of clients perform the following: providing for allocating IP addresses without a Dynamic Host Configuration Protocol (DHCP) sewer; providing for translating between names and IP addresses without a Domain Name System (DNS) server; and, locating or advertising services without a directory server.

17. The computer readable medium of claim 16 wherein the network includes a storage area device coupled to the plurality of controller computers and the plurality of clients.

18. The computer readable medium of claim 17 wherein the plurality of controller computers notifies the plurality of clients by broadcasting its internet protocol address to each of the plurality of clients.

19. The computer readable medium of claim 18 wherein the interrogation includes accessing information about the plurality of controller computers and its capabilities.

20. The computer readable medium of claim 16 wherein the plurality of clients are notified via a discovery mechanism of the plurality of controller computers.

21. The computer readable medium of claim 16 wherein a file system and discovery mechanism within each of the clients provides the interrogation of the plurality of controller computers.

22. A method for self-registering a plurality of controllers computers in an Internet Protocol (IP) network, the method comprising:
attaching a plurality of controller computers to the network in which the plurality of controller computers is coupled with a plurality of clients, wherein the plurality of controller computers automatically self-registers themselves using a discovery mechanism within each of the plurality of clients on the network upon attachment to the network;
notifying the coupled plurality of clients,
interrogating the plurality of controller computers by each of the plurality of clients coupled with the plurality of controller computers; and,
updating each of the plurality of clients interrogating the plurality of controller computers in relation to the interrogation; wherein any of the plurality of clients starts a synchronization sequence to interrogate the plurality of controller computers, filtering out those controller computers which are not part of the network and querying the configuration of a first controller computer it finds that is coupled to the network; wherein each of the controller computers and each of the plurality of clients perform the following: providing for allocating IP addresses without a Dynamic Host Configuration Protocol (DHCP) server; providing for translating between names and IP addresses without a Domain Name System (DNS) server; and, locating or advertising services without a directory server.

23. The method of claim 22 wherein a file system and discovery mechanism within each of the plurality of clients provides the interrogation of the plurality of controller computers.

* * * * *

UNITED STATES PATENT AND TRADEMARK OFFICE
CERTIFICATE OF CORRECTION

| | | |
|---|---|---|
| PATENT NO. | : 7,587,495 B2 | Page 1 of 2 |
| APPLICATION NO. | : 10/928026 | |
| DATED | : September 8, 2009 | |
| INVENTOR(S) | : Albouze et al. | |

It is certified that error appears in the above-identified patent and that said Letters Patent is hereby corrected as shown below:

On the face page, in field (56), under "Other Publications", in column 2, line 1, delete "techiniques"" and insert -- techniques" --, therefor.

On the face page, in field (57), under "Abstract", in column 2, line 14, after "controller" insert -- . --.

In column 1, line 56, after "controller" insert -- . --.

In column 3, line 20, delete "Or" and insert -- or --, therefor.

In column 4, line 8, in Claim 1, after "Internet Protocol" insert -- (IP) --.

In column 4, lines 12-13, in Claim 1, after "network" delete "are operable to".

In column 4, line 23, in Claim 1, after "controller" insert -- computer --.

In column 4, line 33, in Claim 2, after "coupled to" insert -- the --.

In column 4, line 37, in Claim 3, delete "internet protocol" and insert -- IP --, therefor.

In column 5, line 4, in Claim 7, delete "sewer;" and insert -- server; --, therefor.

In column 5, line 11, in Claim 9, delete "internet protocol" and insert -- IP --, therefor.

In column 5, line 25, in Claim 13, delete "clients;" and insert -- client; --, therefor.

In column 5, line 29, in Claim 13, after "computer" insert -- system --.

In column 5, line 31, in Claim 13, after "computer" insert -- system --.

Signed and Sealed this
Twenty-second Day of November, 2011

David J. Kappos
*Director of the United States Patent and Trademark Office*

CERTIFICATE OF CORRECTION (continued)
U.S. Pat. No. 7,587,495 B2

In column 5, line 37, in Claim 13, after "computer" insert -- system --.

In column 6, line 12, in Claim 16, delete "sewer;" and insert -- server; --, therefor.

In column 6, line 22, in Claim 17, delete "internet protocol" and insert -- IP --, therefor.

In column 6, line 34, in Claim 22, delete "controllers" and insert -- controller --, therefor.

In column 6, line 55, in Claim 22, after "computers" insert -- , --.